US012229133B1

(12) United States Patent
Eleish et al.

(10) Patent No.: US 12,229,133 B1
(45) Date of Patent: Feb. 18, 2025

(54) SYSTEM AND ALGORITHMS FOR FAST AND SCALABLE DATA ACCESS TO HIGH DIMENSIONALITY WITH SPARSE DATA

(71) Applicant: Workday, Inc., Pleasanton, CA (US)

(72) Inventors: Ragy Eleish, Las Vegas, NV (US); Aaron Kaminsky, San Jose, CA (US); Yunfeng Fei, Fremont, CA (US); Yuh-Ming Shyy, Saratoga, CA (US); Ramabrahmam Venkata Velury, Santa Clara, CA (US); Ashish Patel, Fremont, CA (US); Christof Bornhoevd, Belmont, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 18/186,045

(22) Filed: Mar. 17, 2023

(51) Int. Cl.
*G06F 7/00* (2006.01)
*G06F 16/2453* (2019.01)
*G06F 16/2455* (2019.01)
*G06F 16/248* (2019.01)

(52) U.S. Cl.
CPC .... *G06F 16/24542* (2019.01); *G06F 16/2455* (2019.01); *G06F 16/248* (2019.01)

(58) Field of Classification Search
CPC ........... G06F 16/24542; G06F 16/2455; G06F 16/248; G06F 16/287; G06F 16/9024; G06F 16/90335; G06F 16/245; G06F 16/144; G06F 16/33; G06F 16/3331; G06F 16/156; G06F 16/438; G06F 3/0485; G06F 3/0482
See application file for complete search history.

(56) References Cited

U.S. PATENT DOCUMENTS

| | | | | |
|---|---|---|---|---|
| 8,650,218 | B2* | 2/2014 | Gangadhar | G06F 17/00 707/606 |
| 2006/0053136 | A1* | 3/2006 | Ashiri | G06F 16/2465 |
| 2008/0154942 | A1* | 6/2008 | Tsai | G06F 16/90335 707/999.102 |
| 2012/0117054 | A1* | 5/2012 | Shrinivas | G06F 16/24545 707/E17.131 |
| 2017/0017683 | A1* | 1/2017 | Fourny | G06F 16/22 |
| 2023/0289868 | A1* | 9/2023 | Bender | G06F 16/954 |

* cited by examiner

*Primary Examiner* — Mohammad A Sana
(74) *Attorney, Agent, or Firm* — Van Pelt, Yi & James LLP

(57) ABSTRACT

The present application discloses a method, system, and computer system for processing queries to sparsely populated datasets. The method includes (i) receiving a query from a client system, (ii) determining, based at least in part on the query, a plurality of partitions of a hypercube that are expected to comprise information used in generating a response for the query, (iii) communicating a set of requests to a data source storing the hypercube, the set of requests comprising one or more requests corresponding to the plurality of partitions of the hypercube, (iv) obtaining, from the data source, a set of results to the set of requests, the set of results comprising data stored in the plurality of partitions of the hypercube, (v) determining a plurality of virtual objects for the set of results, (vi) combining the plurality of virtual objects into a response to the query, and (vii) providing, to the client system, the response to the query.

18 Claims, 12 Drawing Sheets

|  | Segment X1 | Segment X2 | Segment X3 |
|---|---|---|---|
| Segment Y1 | Segment Intersection X1, Y1 | Segment Intersection X2, Y1 | Segment Intersection X3, Y1 |
| Segment Y2 | Segment Intersection X1, Y2 | Segment Intersection X2, Y2 | Segment Intersection X3, Y2 |

SYSTEM AND ALGORITHMS FOR FAST AND SCALABLE DATA ACCESS TO HIGH DIMENSIONALITY WITH SPARSE DATA

BACKGROUND OF THE INVENTION

The evolution of data analytics has resulted in organizations developing very large datasets in which significant information and types of information is collected. At scale, the datasets used by organizations have a significant number of dimensions. For example, datasets may have hundreds or thousands of rows or columns. As each dimension is added to the dataset, the potential space at which data may be stored increases exponentially. Accordingly, processing queries against the dataset generally requires significant computational expense (e.g., time, compute resources, etc.).

BRIEF DESCRIPTION OF THE DRAWINGS

Various embodiments of the invention are disclosed in the following detailed description and the accompanying drawings.

FIG. 4 is an illustration of an example of segments associated with partitions of a dataset comprising data according to various embodiments.

DETAILED DESCRIPTION

Figure 1:
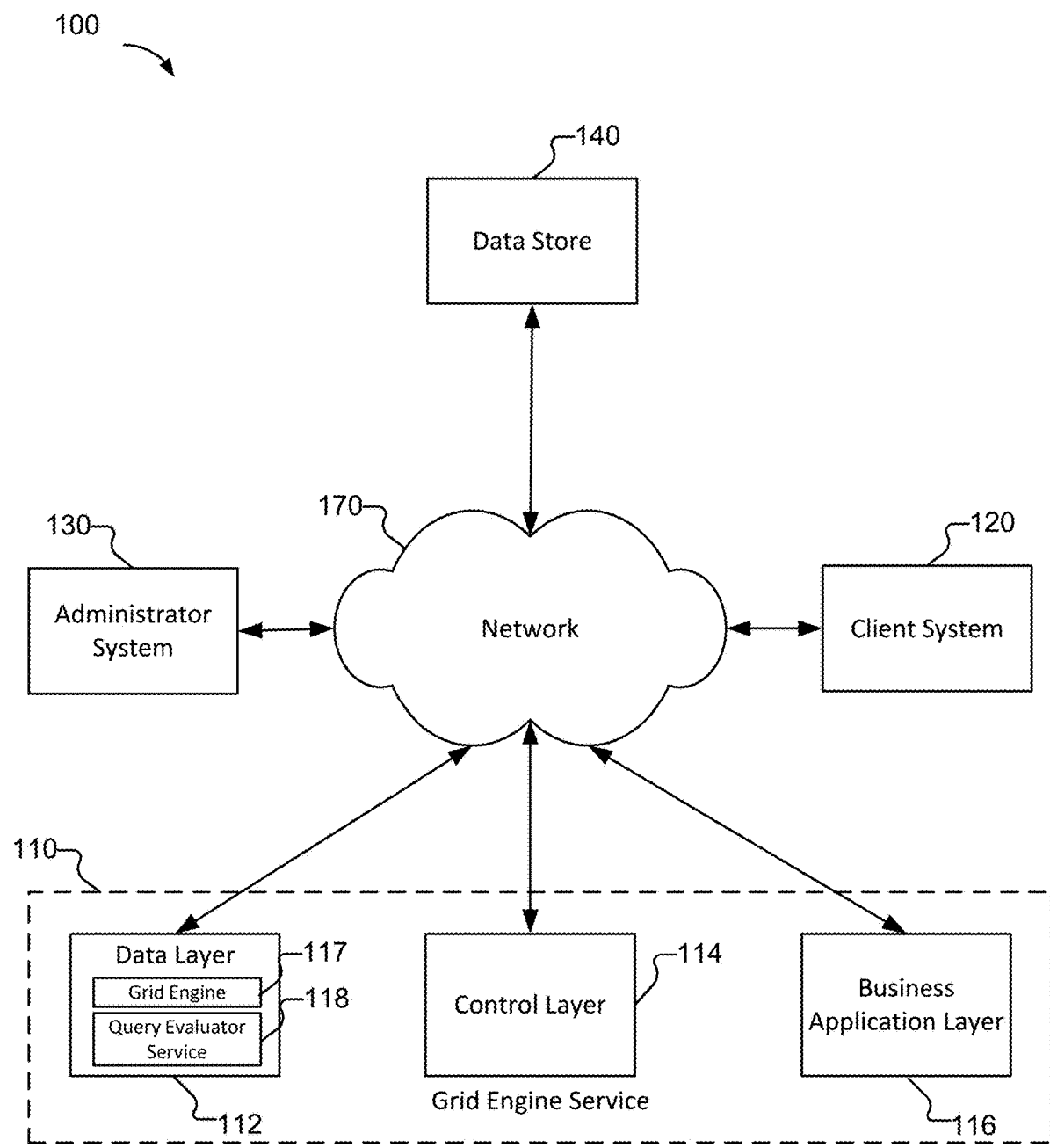
FIG. 1 is a block diagram of a system for processing queries according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a hypercube may mean an N×M×Z dimensional logical construct in which data for a dataset may be stored. As an example, each cell in the hypercube corresponds to a location at which data may be stored. N, M, and Z are positive integers.

As datasets used by organizations scale, the number of locations (e.g., cells in the corresponding hypercube) at which data is likely to be stored becomes more and more sparsely distributed. If the dimensions of the dataset are significantly large, the hypercube can generally be assumed to be sparsely populated with data. Querying a highly dimensional and very sparse dataset can lead to reports or similar data visualizations defined with trillions (or more) possible cells but that actually contain only thousands (or fewer) cells with actual data. Accordingly, querying such datasets can be computationally expensive and inefficient.

Some related art systems address the problem with highly dimensional and sparsely populated datasets by using attributes to trim the solution space rather than dimensions. The use of attributes can significantly reduce the number of potential cells that a query evaluator needs to consider because impossible combinations do not need to be built or queried. However, such related art techniques generally have a significant latency and a data consumer may be required to reduce the size of the report built based on the query, thereby limiting the scope of the report, such as a number of dimensions for which information may be queried and included in the report.

Various embodiments provide a system, method, and device for processing queries, such as queries against datasets that are sparsely populated with data. The method includes (i) receiving a query from a client system, (ii) determining, based at least in part on the query, a plurality of partitions of a hypercube that are expected to comprise information used in generating a response for the query, (iii) communicating a set of requests to a data source storing the hypercube, the set of requests comprising one or more requests corresponding to the plurality of partitions of the hypercube, (iv) obtaining, from the data source, a set of results to the set of requests, the set of results comprising data stored in the plurality of partitions of the hypercube, (v) determining a plurality of virtual objects for the set of results, (vi) combining the plurality of virtual objects into a response to the query, and (vii) providing, to the client system, the response to the query.

According to various embodiments, a query processing system comprises a planning service that receives and plans queries to be run against a dataset and an evaluator service (e.g., a query evaluator service) that evaluates the query with respect to the dataset. Various embodiments abstract away from the evaluator service the decomposition of a query for determining the bounds of the query and/or identifying locations in the dataset where relevant information is expected to be stored. For example, in some embodiments, the planning service receives query logic from another system (e.g., a client system operated by a user, or another system that is running a service, etc.) and generates a declarative specification of information to be obtained from the hypercube corresponding to the dataset. The planning service (e.g., a query engine comprised in the planning service) then sends to the evaluator service a call comprising the declarative statement. In some embodiments, the declarative specification of information to be obtained from a hypercube includes information that delineates logic or parameters for querying the hypercube. In response to receiving the call, the evaluator service parses the declarative specification and generates a plurality of matrix requests pertaining to segments of the hypercube to be specified. The matrix requests are generated based at least in part on the declarative specification, such as by using the delineation of logic/parameters pertaining to the segments of the hypercube to be queried. One example is using one dimension to partition the requests—for example, to make separate requests for one version (e.g., a budget) vs. another version (e.g., a forecast) and then to combine these two versions into a grid showing the comparison. A second example is when creating a response that is a compound of different structures—for example, when showing one account broken down by region compared to a different account broken down by customer (or more generically, one measure split into values along one dimension and a second measure split into values along a different dimension). A third example is when comparing different scenarios of a version, where each scenario is populated by different matrix requests.

In some embodiments, the system receives a query from another system, such as a client system operated by a user, a system providing a service to various other systems, etc. In response to receiving the query, the system determines the domain of the query. For example, the system determines the boundaries of information that is to be provided in response to the query or otherwise used in connection with processing the query. After the domain of the query is determined, the system performs query processing to identify regions of the underlying hypercube (e.g., the hypercube corresponding to the dataset being queried) comprising data to be used in responding to the query. For example, the system determines the locations within the hypercube in which data relevant to the query is expected to be stored. Based on the assumption that the hypercube is sparsely populated (e.g., because the dimensionality of the hypercube is significantly large), the system determines those locations (e.g., regions, segments, etc.) of the hypercube in which relevant data is expected to be stored and the system queries the hypercube based on those locations. For example, the system can restrict the area of the queries against the hypercube (or underlying dataset) to only those regions in which the sparsely distributed data is expected to be stored. In this way, in contrast to related art systems, the system does not collect data in empty cells, or otherwise reduces the number of empty cells queried as compared to such related art systems.

In response to determining the hypercube locations at which relevant data is expected to be stored, the system queries the hypercube based on such locations. For example, the system sends a call to a query evaluator service that parses the information pertaining to the call and queries the dataset for data. The call sent to the query evaluator service comprises the parameters/logic that identify the locations in the hypercube at which relevant data is expected to be stored. Accordingly, the query evaluator service is not required to perform the computation for determining the locations.

In response to collecting the locations with data from the hypercube (e.g., determining a list of hypercube locations with data—for example, not empty hypercube cells), the system uses the sparse coordinates and dimensionality (e.g., a set of coordinates and their ranges/extents within a given dimension as determined from the list of hypercube locations with data) to reconstruct a grid (e.g., a report) that was requested via the query. Examples of a report generated from a query include a report indicating all sales of products by sales people in a particular region. Although the system receives the data from the queried locations from the hypercube, the system does not receive the connective information that shows interdependencies among dimensions of the hypercube or data stored in the hypercube. According to various embodiments, the system determines one or more virtual cartesian objects (e.g., representations of data structures) corresponding to the locations from which data was obtained. The system uses the virtual cartesian objects to determine a lineage for the data. The system transforms the virtual cartesian objects to obtain responsive data based on the original query. The original query can include requests for rows, cells, or filtering beyond direct references to hypercube coordinates. For example, it could include details to filter some or all of the resulting grid by an attribute of the dimensions in the hypercube. Another example is that the desired row or column could be a calculation using the raw data returned from the hypercube, like a subtotal or a mathematical expression. A third example is the inclusion of blank lines or text headers that need to be interspersed with the data to produce the requested layout. In some embodiments, the transformations of the virtual cartesian objects include one or more of (i) performing, based on the query, the computations on the data obtained from the hypercube (e.g., performing a computation such as row A+row B, or other computation required by the query, etc.), (ii) performing an attribute filtering, and/or (iii) performing a row insertion into the grid. In some embodiments, the system only performs read operations and not write operations. In some embodiments, the transformations of the virtual objects include combining the virtual cartesian objects into a single cartesian object and enforcing size or dimensionality on the combined object. For example, the combining the plurality of virtual objects into the response comprises enforcing a bounding criterion with respect to the response to the query. The transforming of the virtual cartesian objects may include building each tier hierarchy (e.g., when data is obtained, the system obtains leaf layers or parts of the tree corresponding to the dataset), obtaining all the relevant data values, and mapping the obtained values into the original tree to obtain the set of data responsive to the query.

The enforcement of size or dimensionality may be based on one or more preconfigured policies or settings. For example, the one or more preconfigured policies or settings define a set of bounding criteria to be enforced with respect to the combined object. In some embodiments, enforcing the bounding criteria with respect to the response to the query includes restricting a number of cells, rows, or columns in the response to a predefined maximum number or a predefined maximum size of a dimension of the combined object. In response to obtaining the combined object, the system creates a grid comprising data responsive to the query. The grid may be used to generate a report or sheet in connection with providing the results to the query.

The enforcement of identifying locations in the hypercube expected to store relevant data and querying the hypercube (e.g., the underlying dataset) at only those locations in connection with obtaining the set of virtual objects restricts the query processing based on the size of the data (e.g., data relevant to processing the query) rather than the size of the potential space. Accordingly, the system, method, and/or device according to various embodiments is more efficient in connection with processing queries. For example, processing the queries against sparsely populated hypercubes according to various embodiments has less computational cost or need for computational resources as compared to related art systems. As another example, the query processing according to various embodiments has less latency than the query processing using related art systems.

FIG. 1 is a block diagram of a system for processing queries according to various embodiments of the present application. In some embodiments, system 100 implements system 200 of FIG. 2, system 500 of FIG. 5, and/or system 600 of FIG. 6. In some embodiments, system 100 implements process 700 of FIG. 7, process 800 of FIG. 8, process 900 of FIG. 9, process 1000 of FIG. 10, and/or process 1100 of FIG. 11.

In the example illustrated in FIG. 1, system 100 includes grid engine service 110, client system 120, and/or administrator system 130. System 100 may additionally include one or more data stores, such as data store 140, and network 170 over which one or more of grid engine service 110, client system 120, administrator system 130, and data store 140 are connected. In some embodiments, grid engine service 110 is implemented by a plurality of servers. In various embodiments, network 170 includes one or more of a wired network and/or a wireless network such as a cellular network, a wireless local area network (WLAN), or any other appropriate network. System 100 may include various other systems or terminals.

In some embodiments, grid engine service 110 comprises data layer 112, control layer 114, and/or business application layer 116. Data layer 112, control layer 114, and/or business application layer 116 is respectively implemented by one or more servers. In some embodiments, data layer 112 comprises one or more clusters of compute resources. Data layer 112 comprises grid engine 117 and query evaluator service 118. In some embodiments, grid engine 117 is a service that receives a query, defines the parameters for a grid to be generated in response to the query, identifies partitions of the hypercube to be queried (e.g., a set of locations in the hypercube at which relevant data is expected to be stored), receives data for the various partitions, manipulates the data, and generates a response grid (e.g., a grid resulting from evaluating the query). In some embodiments, query evaluator service 118 is a service that queries a hypercube (e.g., an underlying dataset stored on data store 140) such as based at least in part on information that pertains to the query and that is received from grid engine 117. For example, query evaluator service 118 receives a grid definition from grid engine 117 and query evaluator service 118 deconstructs the grid definition into a plurality of calls/requests respectively corresponding to the identified partitions of the hypercube. Query evaluator service 118 then communicates the calls in connection with querying the hypercube (e.g., the calls are communicated to data store 140).

In various embodiments, grid engine service 110 processes workloads, such as at scale for big data evaluations across datasets that are sparsely populated (e.g., datasets having significantly large dimensionality). Grid engine service 110 is configured to receive one or more queries (e.g., business logic to be executed) from another system, such as client system 120. In response to receiving the one or more queries, grid engine service 110 (e.g., control layer 114) determines one or more datasets storing data for which the other system is seeking to evaluate. In response to determining the dataset(s), grid engine service 110 obtains business logic to be executed (e.g., in connection with evaluating/analyzing the data). In some embodiments, grid engine service 110 deconstructs the query to determine a set of partitions of the hypercube that are expected to store relevant data (e.g., data relevant to providing a response to the query). In response to determining the set of partitions, grid engine service 110 generates a plurality of calls to be evaluated against the dataset for the set of partitions. In some embodiments, the calls are either evaluated in parallel or sequentially depending on the specific embodiment. For example, grid engine service 110 evaluates queries against only those partitions of the hypercube that are expected to store relevant data. Accordingly, by not evaluating the query against the entirety of the hypercube, grid engine service 110 provides a very efficient mechanism for evaluating a query. Grid engine service 110 is further configured to execute the business logic and provide the other system with a result (e.g., a pointer to a result, such as a result identifier, that the other system may use to obtain the result). In connection with executing the business logic, grid engine service 110 may configure the requisite infrastructure to be used during the execution, including configuring and establishing the connections between the compute resource(s) (e.g., cluster(s) of compute resource(s)) and the applicable data store(s), pooling compute resource(s) (e.g., according to a compute resource allocation strategy), configuring the compute resource(s), and causing the compute resource(s) to execute the business logic.

In some embodiments, before executing the business logic, grid engine service 110 enforces one or more security policies, such as performing a determination of whether the business logic comprises malicious code (e.g., performing a maliciousness classification with respect to the business logic).

In response to executing the business logic, grid engine service 110 obtains a result (e.g., data responsive to the evaluation of the query). For example, grid engine service 110 receives a set of results comprising data pertaining to the set of partitions of the hypercube that were queried. In response to receiving the set of results, grid engine service 110 combines the set of results to obtain a final result (e.g., a response grid), which may be processed to generate a report or sheet responsive to the query. In some embodiments, the combining the set of results to obtain the final result includes transforming the set of results to include the metadata indicating the dependencies among the results and/or a manner by which the set of results are connected (e.g., to enable grid engine service 110 to assemble the set of results to obtain the response grid). Grid engine service 110 provides the result to client system 120. For example, grid engine service 110 uses business application layer 116 to configure a user interface to display the results (e.g., provide a report or a sheet to client system 120). As another example, grid engine service 110 obtains a result identifier or other pointer associated with the results and provides the result identifier or other pointer to client system 120 for the user to obtain the results.

In some embodiments, data layer 112 manages a cluster of compute resources to execute the business logic. For example, data layer 112 establishes the connections between the set of compute resources and the data source(s) and allocates the workload for the business logic across the set of compute resources.

According to various embodiments, business application layer 116 provides an interface via which a user (e.g., using client system 120) may interact with various applications such as a development application for developing a service, application, and/or code, an application to access raw data (e.g., data stored in data store 140), an application to analyze data (e.g., log data), etc. Various other applications can be provided by business application layer 116. For example, a user queries data layer 112 by sending a query/request to business application layer 116, which interfaces with data layer 112 and/or data store 140 to obtain information responsive to the query (e.g., business application layer 116 formats the query according to the applicable syntax and sends the formatted query to data layer 112, such as via control layer 114). As another example, an administrator uses an interface provided/configured by business application layer 116 to configure (e.g., define) one or more security policies including access permissions to information stored on data store 140, permissions to access performance profiles, etc.

Administrator system 130 comprises an administrator system for use by an administrator. For example, administrator system 130 comprises a system for communication, data access, computation, etc. An administrator uses administrator system 130 to maintain and/or configure grid engine service 110 and/or one or more of data stores (e.g., data store 140). For example, an administrator uses administrator system 130 to start and/or stop services on grid engine service 110 and/or data store 140, to reboot data store 140, to install software on grid engine service 110 and/or data store 140, to add, modify, and/or remove data on data store 140, etc. Administrator system 130 communicates with grid engine service 110 and/or data store 140 via a web-interface. For example, administrator system 130 communicates with grid engine service 110 and/or data store 140 via a web-browser installed on administrator system 130. As an example, administrator system 130 communicates with grid engine service 110 and/or data store 140 via an application running on administrator system 130.

In various embodiments, an administrator (or other user associated with a tenant or entity with which the tenant is associated such as a customer) uses administrator system 130 to configure a service provided to a tenant. As an example, the administrator uses administrator system 130 to communicate with grid engine service 110 to configure the service provided to the tenant. For example, administrator system 130 may communicate with grid engine service 110 via business application layer 116. In some embodiments, business application layer 116 serves as a gateway via which the administrator may interface to manage, configure, etc. data layer 112, control layer 114, and/or business application layer 116. Administrator system 130 may configure one or more policies for grid engine service 110, such as one or more security policies and/or one or more compute resource policies, etc.

Data store 140 stores one or more datasets. In various embodiments, the one or more datasets comprise human resources data, financial data, organizational planning data, or any other appropriate data. In some embodiments, data store 140 stores one or more datasets for a plurality of tenants. For example, data store 140 hosts at least part of a software as a service (e.g., a database storing data for the service) for a plurality of tenants such as customers for a provider of the software as a service. In various embodiments, a tenant comprises an organization such as a company, a government entity, a sub-organization of an organization (e.g., a department), or any other appropriate organization. For example, data store 140 comprises one or more database systems for storing data in a table-based data structure, an object-based data structure, etc. In various embodiments, data store 140 comprises one or more of: a business database system, a human resources database system, a financial database system, a university database system, a medical database system, a manufacturing database system, or any other appropriate system. In some embodiments, data store 140 comprises one or more object-oriented database systems.

According to various embodiments, a user uses system 100 (e.g., a client or terminal, such as client system 120, that connects to grid engine service 110 via network 170) to define business logic and/or to execute such business logic with respect to data (e.g., one or more datasets) stored on data store 140. For example, a user inputs to client system 120 one or more queries to be run against a dataset. In response to receiving the business logic, grid engine service 110 uses data layer 112 (e.g., a cluster of compute resources) to execute the business logic (e.g., with respect to data stored by data store 140) and provides a result to the user (e.g., via a user interface provided on client system 120). In some embodiments, the result comprises information or a set of information that is responsive to the execution of the business logic. Grid engine service 110 may enforce one or more security policies with respect to the result, including restricting access to certain information to which the user associated with client system 120 does not have permissions or otherwise masking certain information. In some embodiments, the result comprises a report including information that is responsive to the execution of the business logic or selectable elements (e.g., links such as hyperlinks) that point to information that is responsive to the execution of the business logic. The result may be provided in a dataframe, a report, and/or a sheet.

In some embodiments, data layer 112, control layer 114, and/or business application layer 116 are implemented on a single server or a plurality of servers. For example, data layer 112 and business application layer 116 are different modules running on a same server or set of servers.

Figure 2:
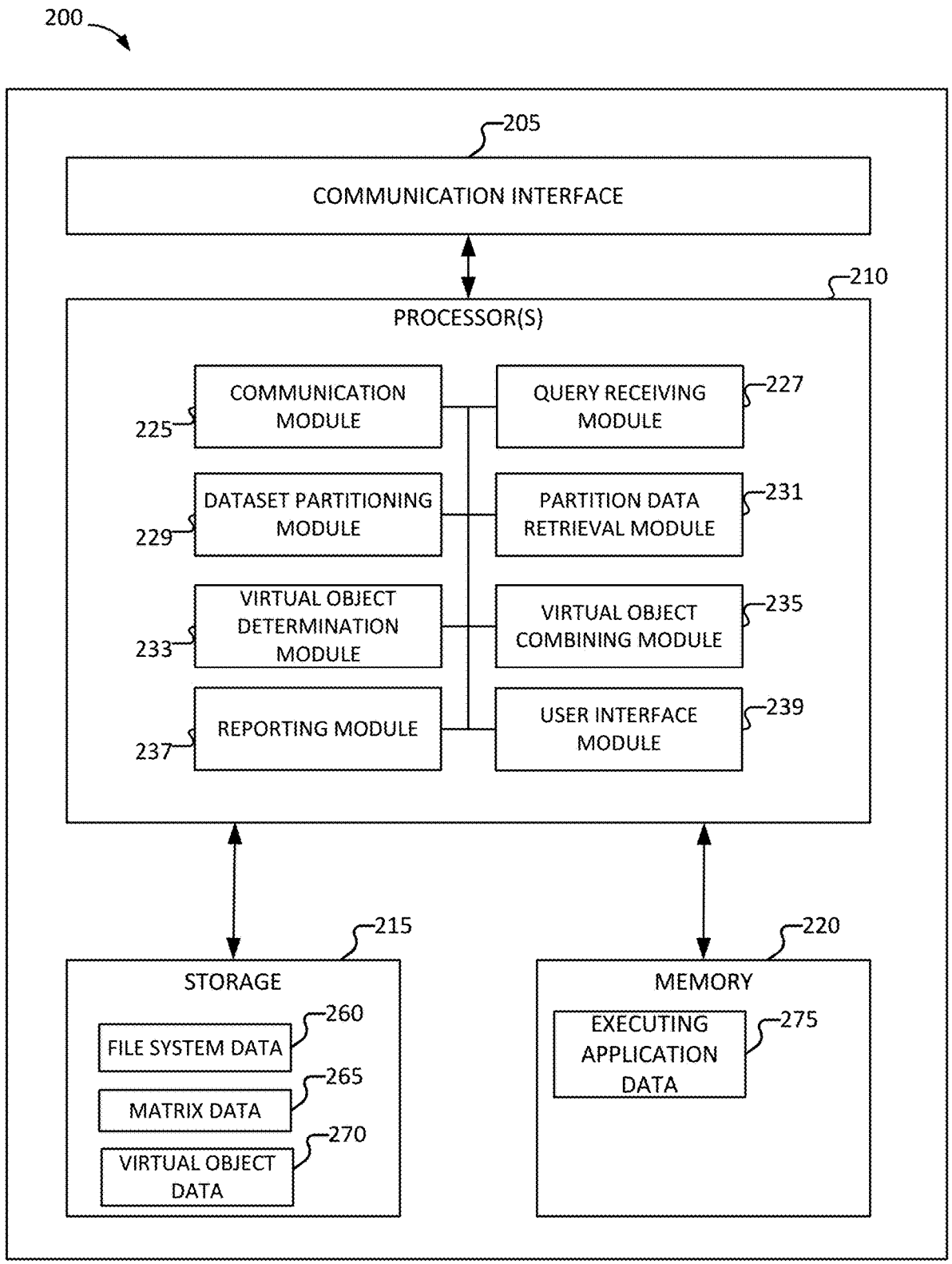
FIG. 2 is a block diagram of a system for processing queries according to various embodiments of the present application.

FIG. 2 is a block diagram of a system for processing queries according to various embodiments of the present application. In some embodiments, system 200 is implemented at least in part by system 100 of FIG. 1. For example, system 200 may correspond to grid engine service 110. In some embodiments, system 200 implements system 500 of FIG. 5 and/or system 600 of FIG. 6. In some embodiments, system 200 implements process 700 of FIG. 7, process 800 of FIG. 8, process 900 of FIG. 9, process 1000 of FIG. 10, and/or process 1100 of FIG. 11. According to various embodiments, system 200 corresponds to, or comprises, a system for processing a query against a sparsely populated hypercube, including receiving logic for a query, determining a set of locations in the hypercube at which data is expected to be stored, generating a call based on the set of locations (e.g., generating a declarative statement that delineates the various locations), communicating the call to a service (e.g., a query evaluator service) that will query the hypercube based on the dataset, obtaining the resulting data from the set of locations, and processing the data to obtain a result for the query.

In the example shown, system 200 implements one or more modules in connection with processing queries against sparsely populated datasets. System 200 comprises communication interface 205, one or more processors 210, storage 215, and/or memory 220. One or more processors 210 comprises one or more of communication module 225, query receiving module 227, dataset partitioning module 229, partition data retrieval module 231, virtual object determination module 233, virtual object combining module 235, reporting module 237, and/or user interface module 239.

In some embodiments, system 200 comprises communication module 225. System 200 uses communication module 225 to communicate with various client terminals or user systems such as a user system (e.g., client system 120) or an administrator system (e.g., administrator system 130), various other services, or data store 140, etc. For example, communication module 225 provides to communication interface 205 information that is to be communicated to the other systems or services. As another example, communication interface 205 provides to communication module 225 information received by system 200. Communication module 225 is configured to receive one or more queries or requests to execute business logic (e.g., requests for processing workloads, servicing queries, etc.) such as from various client systems (e.g., via a business application layer). The one or more queries or requests to execute tasks is with respect to information stored in one or more datasets (e.g., data stored in data store 140). Communication module 225 is configured to provide to various client terminals or user systems information such as information that is responsive to the one or more queries or tasks requested to be executed. In some embodiments, communication module 225 provides the information to the various other systems or services information in the form of one or more reports or sheets (e.g., according to a predefined format or to a requested format), and/or via one or more user interfaces (e.g., an interface that the user system is caused to display).

In some embodiments, system 200 comprises query receiving module 227. System 200 uses query receiving module 227 to receive, via communication module 225, a query from another system, such as a client system via which a user inputs the query, or a service that uses data responsive to the query in connection with providing a service to various other systems. In some embodiments, the query comprises a grid request that describes the desired data, such as an indication of the rows and/or columns for the responsive grid (e.g., a grid that can include information calculated based on the underlying dataset, such as computations of variance, addition, subtraction, etc.). The grid request may further include logic for how hierarchies among data are to be handled.

In some embodiments, system 200 comprises dataset partitioning module 229. System 200 uses dataset partitioning module 229 to determine locations in the hypercube (e.g., the underlying dataset) at which data relevant to generating a response to the query is expected to be stored. For example, dataset partitioning module 229 determines a set of partitions (e.g., segments) of the dataset for which system 200 is to obtain data to generate a response to the query. The set of partitions may be substantially (or entirely) non-overlapping. Dataset partitioning module 229 obtains the query (or the query logic) from query receiving module 227. In response to obtaining the query, dataset partitioning module 229 parses/processes the query to determine the domain of the query (e.g., the boundaries in one or more segments or regions of the hypercube within which relevant data is expected to be stored). In response to determining the domain of the query, dataset partitioning module 229 generates a declarative statement comprising information indicating the locations in the hypercube from which data is to be retrieved for processing the query. The information indicating the locations in the hypercube may delineate a plurality of segments/regions of the hypercube within which data is to be retrieved. In some embodiments, the declarative statement includes a synthetic identifier corresponding to a location(s) in the responsive grid for which the data is to be retrieved. For example, if a part of the final grid includes logic in which a value corresponds to a summation of a value in row A and a value in row B of the dataset, the system obtains information for row A and row B for populating/computing the response at the corresponding location in the final grid.

In some embodiments, system 200 comprises partition data retrieval module 231. System 200 uses partition data retrieval module 231 to query the dataset based at least in part on the declarative statement. For example, partition data retrieval module 231 interfaces with a query evaluator service to evaluate the query against the dataset (e.g., against the identified locations from which data is to be obtained). Partition data retrieval module 231 may communicate to the query evaluator service a call comprising the declarative statement, and the query evaluator service parses the declarative statement, determines the delineated locations (e.g., regions, segments, etc.) of the hypercube from which data is to be obtained, and queries the dataset for the corresponding data. The call or declarative statement may correspond to a single request (e.g., a matrix request) that requests data for the identified locations, and the query evaluator service parses the call to determine a plurality of requests respectively corresponding to the various locations (e.g., the various regions/segments of the hypercube). The query evaluator service may communicate the plurality of requests (or at least a subset of the plurality of requests) in parallel. For example, the query evaluator service breaks up the request into intersections of the hypercube that are separable and then communicates corresponding requests for the intersections (e.g., the sections or regions to be queried).

In some embodiments, partition data retrieval module 231 is further configured to receive a response(s) (e.g., a matrix response) comprising the data obtained from the identified locations in the hypercube. The response comprising the data obtained from the identified locations in the hypercube may be comprised in a single response, or a plurality of responses that may be sent at least partially in parallel.

In some embodiments, system 200 comprises virtual object determination module 233. System 200 uses virtual object determination module 233 to obtain the data from the response received by partition data retrieval module 231 and generates a plurality of virtual cartesian objects respectively corresponding to the set of locations in the hypercube from which data was obtained (e.g., the regions or segments of the hypercube at which relevant data was expected to be stored).

In some embodiments, system 200 comprises virtual object combining module 235. System 200 uses virtual object combining module 235 to process the plurality of virtual cartesian objects and combine the plurality of cartesian objects into a response to the query (e.g., a grid response from which a report/sheet may be generated). In some embodiments, the processing the plurality of virtual cartesian objects includes transforming the plurality of virtual cartesian objects to obtain segments of the grid responsive to the query (e.g., the plurality of virtual cartesian objects are transformed to objects having real coordinates associated with a grid response). The combining the plurality of cartesian objects includes combining the segments of the grid resulting from the transformation(s) applied to the plurality of virtual objects. For example, virtual object combining module 235 stitches together the various segments of the grid. In some embodiments, virtual object combining module 235 enforces size restrictions to ensure that the grid response does not exceed a predefined size (e.g., enforces a boundary on a number of cells in the final result).

In some embodiments, system 200 comprises reporting module 237. System 200 uses reporting module 237 to obtain the grid response from virtual object combining module 235 and to process the grid response to generate a report or sheet to be provided as a final result to the query.

In some embodiments, system 200 comprises user interface module 239. System 200 uses user interface module 239 in connection with configuring information (or the display thereof) to be provided to the user such as via client system 120 and/or administrator system 130 of system 100. In some embodiments, user interface module 239 configures a user interface to be displayed at a client system, such as an interface that is provided in a web browser at the client system. User interface module 239 may configure a user interface via which a query may be input. In some embodiments, user interface module 239 configures a user interface to provide a response to the query, such as by providing one or more reports of information that is responsive to a query or task executed with respect to the source dataset(s) (e.g., a query or task executed against data stored on data store 140).

According to various embodiments, storage 215 comprises one or more of file system data 260, matrix data 265, and/or virtual object data 270. Storage 215 comprises a shared storage (e.g., a network storage system). In some embodiments, file system data 260 comprises a database such as one or more datasets (e.g., one or more datasets for one or more tenants, etc.). File system data 260 comprises data such as a dataset for historical information pertaining to user activity, a human resources database, a financial database, etc. In some embodiments, matrix data 265 comprises information pertaining to one or more of (i) a set of locations (e.g., regions, segments, etc.) of the hypercube at which data is expected to be returned, (ii) one or more matrix requests to be sent for query evaluation against the hypercube; and (iii) one or more matrix responses comprising data retrieved from the set of locations. In some embodiments, virtual object data 270 comprises (a) the plurality of virtual cartesian objects that are generated based on the data retrieved from the set of locations, (b) transformed virtual cartesian objects obtained based on performing one or more transformations against the plurality of virtual objects, and (c) a final combined cartesian object (e.g., a grid that has been transformed into the real dimensionality corresponding to the hypercube).

According to various embodiments, memory 220 comprises executing application data 275. Executing application data 275 comprises data obtained or used in connection with executing an application such as an application executing on a tenant. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3A:
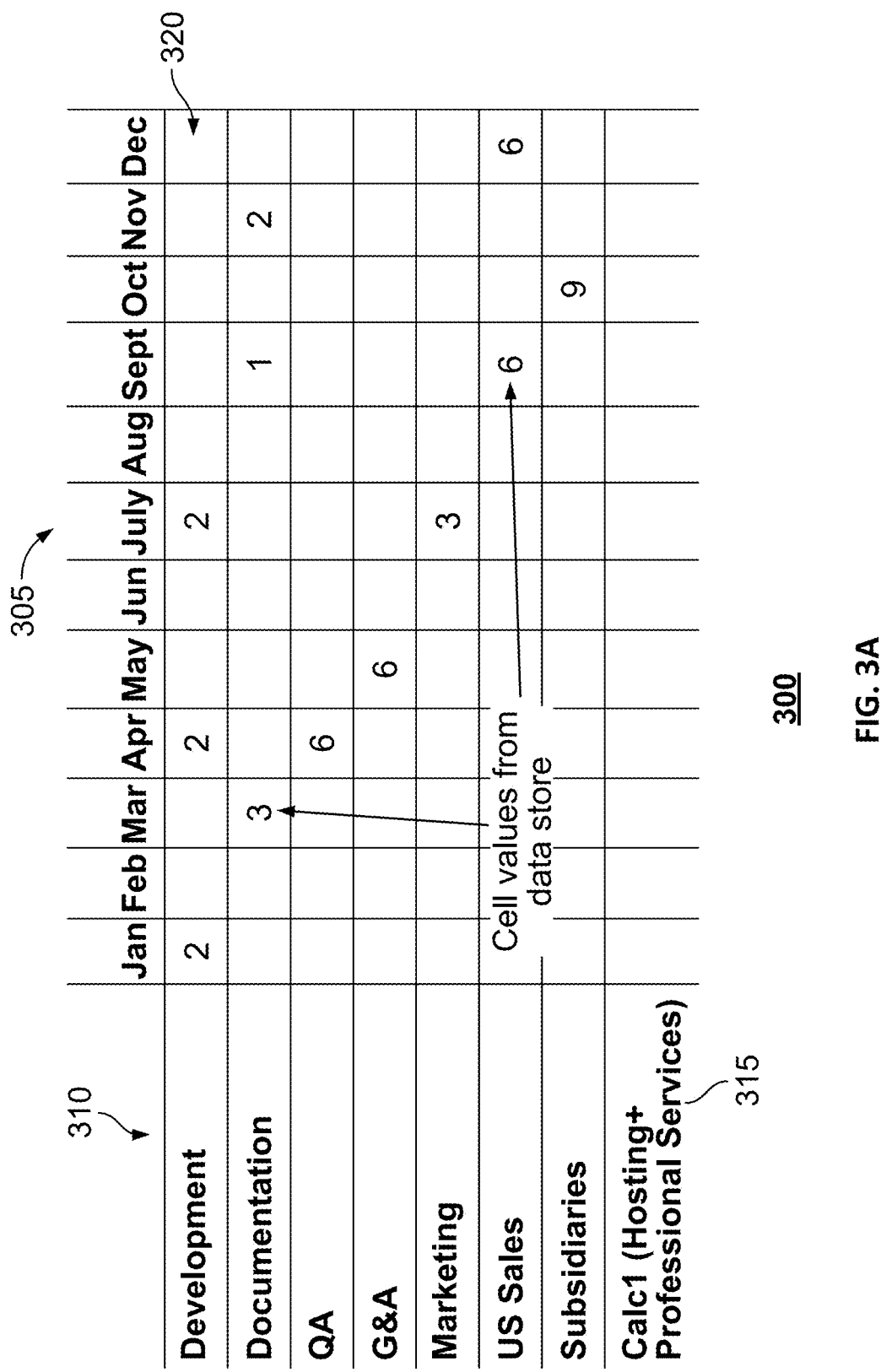
FIG. 3A is an illustration of an example of a dataset sparsely populated with data according to various embodiments of the present application.

FIG. 3A is an illustration of an example of a dataset sparsely populated with data according to various embodiments of the present application. In the example shown, hypercube 300 comprises sparsely distributed data. Hypercube 300 comprises time dimension 305 (e.g., corresponding to a predefined time interval, such as months in the example shown) and organization dimension 310 (e.g., corresponding to departments in an organization, etc.). A report generated based on data comprised in hypercube 300 may include report field 315 in which a computation is performed with respect to data in hypercube 300. Hypercube 300 further comprises data values 320 comprising a plurality of cells that are sparsely populated with data. The data for the values in data values 320 may be obtained from the corresponding dataset (e.g., a dataset stored on a data store). In some embodiments, report field 315 corresponds to a query processed against hypercube 300. For example, report field 315 comprises a result to the query or a value used to obtain the final result to the query.

Figure 3B:
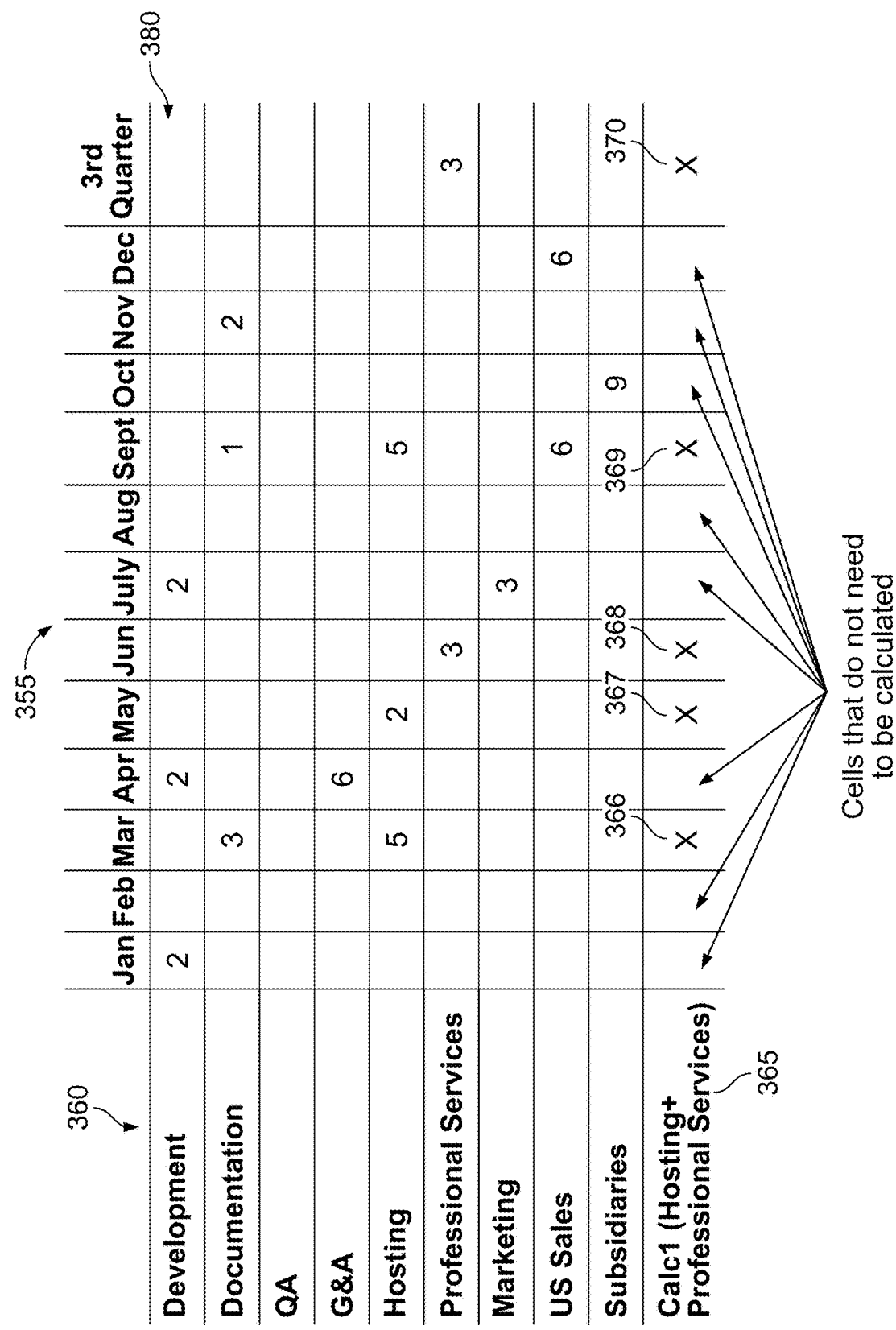
FIG. 3B is an illustration of an example of a dataset sparsely populated with data according to various embodiments of the present application.

FIG. 3B is an illustration of an example of a dataset sparsely populated with data according to various embodiments of the present application. In the example shown, hypercube 350 comprises sparsely distributed data. Hypercube 350 comprises time dimension 355 (e.g., corresponding to a predefined time interval, such as months in the example shown) and organization dimension 360 (e.g., corresponding to departments in an organization, etc.). A report generated based on data comprised in the hypercube may include report field 365 in which a computation is performed with respect to data in the hypercube. Hypercube 350 further comprises data values 380 comprising a plurality of cells that are sparsely populated with data. The data for the values in data values 380 may be obtained from the corresponding dataset (e.g., a dataset stored on a data store). In some embodiments, report field 365 corresponds to a query processed against hypercube 350. For example, report field 365 comprises a result to the query or a value used to obtain the final result to the query. As illustrated in FIG. 3B, running the computation for report field 365 against hypercube 350 would result in many of the cells in report field 365 to have no resulting data. Related art systems would run the query against hypercube 350, including querying the corresponding cells in hypercube 350 which do not comprise data and then executing the computation and generating an empty cell. According to various embodiments, the system determines the cells for which data is expected to be stored and queries hypercube 350 for only data required to generate the results in cells in report field 365 that are expected to comprise data (e.g., cells 366, 367, 368, 369, and 370).

FIG. 4 is an illustration of an example of segments associated with partitions of a dataset comprising data according to various embodiments. In the example shown, part of a hypercube against which a query is to be executed can be represented by a segment intersection 400. In some embodiments, a grid (e.g., a hypercube or a grid of a result generated using data comprised in the hypercube) is divided into a plurality of segment intersections such as segment intersection 400. Cross-segment dependency is possible when a formula (e.g., for a computation to be run for the report) in one segment intersection references an element in another segment intersection. In some embodiments, each segment intersection is atomic and can be processed in parallel during the generation of the response grid (e.g., the grid from which the report responsive to the query is to be generated).

According to various embodiments, generating the response grid comprises (i) pre-processing each segment intersection to include all the elements needed (e.g., needed to generate a result to the query), (ii) the system makes, for each segment intersection, one or more matrix calls for data in corresponding locations in the hypercube, (iii) the system, for each segment intersection, builds a virtual cartesian hierarchy from a matrix result (e.g., a virtual cartesian object is generated based on the data retrieved from the hypercube based on the matrix calls), (iv) the system merges the hierarchies across segment intersections of the same axis, (v) the system processes, for each segment intersection, the data and performs the necessary calculations to determine a result, and (vi) the system generates a grid response that provides a logical view on top of the segment intersections.

Figure 5:
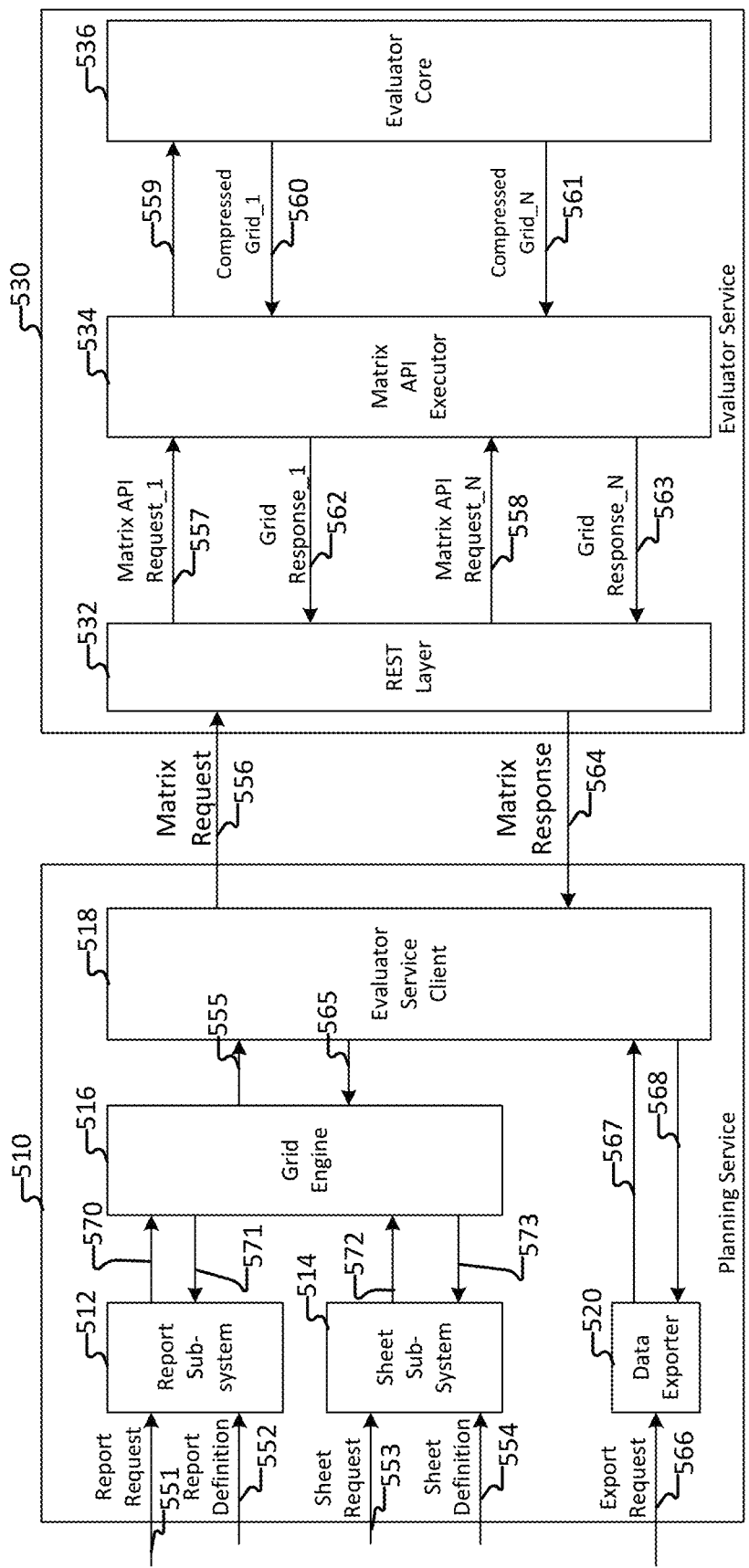
FIG. 5 is a block diagram of a system for processing queries according to various embodiments of the present application.

FIG. 5 is a block diagram of a system for processing queries according to various embodiments of the present application. In some embodiments, system 500 is implemented at least in part by system 100 of FIG. 1 and/or system 200 of FIG. 2. In some embodiments, system 500 implements process 700 of FIG. 7, process 800 of FIG. 8, process 900 of FIG. 9, process 1000 of FIG. 10, and/or process 1100 of FIG. 11. According to various embodiments, system 500 corresponds to, or comprises, a system for processing a query against a sparsely populated hypercube, including receiving logic for a query, determining a set of locations in the hypercube at which data is expected to be stored, generating a call based on the set of locations (e.g., generating a declarative statement that delineates the various locations), communicating the call to a service (e.g., a query evaluator service) that will query the hypercube based on the dataset, obtaining the resulting data from the set of locations, and processing the data to obtain a result for the query.

In the example shown, system 500 comprises planning service 510 and evaluator service 530 (e.g., a query evaluator service). In some embodiments, at least part of planning service 510 is implemented by grid engine service 110 of system 100 of FIG. 1, and/or system 200 of FIG. 2. In some embodiments, evaluator service 530 implements process 1100 of FIG. 11.

As illustrated in FIG. 5, planning service 510 comprises one or more of report sub-system 512, sheet sub-system 514, grid engine 516, and/or evaluator service client 518, and evaluator service 530 comprises one or more of REST layer 532, matrix application programming interface (API) executor 534, and/or evaluator core 536. In some embodiments, system 500 receives, via report sub-system 512, a query such as report request 551 and report definition 552, or receives, via sub-system 514 a query such as sheet request 553 and sheet definition 554. Report sub-system 512 and/or sheet sub-system 514 provide(s) to grid engine 516 the parameters or logic for the query (e.g., along 570 and/or along 572, respectively). In some embodiments, in response to receiving the query, grid engine 516 translates the query into one or more matrix requests (e.g., matrix request 556). For example, grid engine 516 determines a set of locations (e.g., regions, segments, etc.) in a hypercube at which data (e.g., data relevant to a response to the query) is expected to be stored. Grid engine 516 may generate matrix request 556 for each of the locations in the determined set of locations in the hypercube.

In some embodiments, a segment of the hypercube for which values need to be recalculated (e.g., according to the query) is translated from a report or sheet specific call format (e.g., the format of report request 551 or sheet request 553) to a generic declarative description of the locations in the hypercube that are to be calculated in generating the response grid. According to various embodiments, the use of the generic declarative description of the locations of data for calculations enables system 500 to more efficiently query the hypercube by avoiding the explicit definition of the cartesian coordinates for each individual location for which the corresponding value is to be computed. Further, the use of a single generic declarative description ensures that the request communicated to evaluator service 530 for executing the query against the hypercube is small, and allows all possible optimizations (e.g., calculation order, data presence filtering, parallelization of calculations of partial results) to be performed at evaluator service 530 rather than planning service 510.

In response to determining the declarative description of the locations, at 555, grid engine 516 provides the declarative description, or a matrix request(s) comprising the declarative description, to evaluator service client 518, which in turn communicates the declarative description/ matrix request(s) to evaluator service 530 (e.g., matrix request 556). For example, evaluator service client 518 is configured to interface with REST layer 532 of evaluator service 530. In response to receiving the declarative description/matrix request(s), evaluator service 530 (e.g., rest layer 532) deconstructs the declarative description/matrix request to obtain a plurality of matrix requests (e.g., matrix requests 557, 558) respectively corresponding to each of the locations of the hypercube to be queried. In response to receiving the matrix requests, matrix API executor 534 at 559 interfaces with evaluator core 536 for evaluation of the respective data requests with respect to the dataset. At 560 and 561, evaluator core 536 may return a plurality of compressed grids in response to the matrix requests received from matrix API executor 534.

In response to receiving the compressed grids from evaluator core 536, matrix API executor 534 returns a plurality of grid responses (e.g., grid response_1 562, grid response_N 563, etc.) to REST layer 532, which uses the plurality of grid responses to generate matrix response 564 that is responsive to matrix request 556. Matrix response 564 may be a single response or a plurality of responses respectively corresponding to the locations in the hypercube that were identified for querying. In response to receiving matrix response 564, at 565 evaluator service client 518 provides the retrieved partial results (e.g., the results respectively pertaining to the set of locations queried) to grid engine 516. Grid engine 516 then processes the partial results and generates a consolidated final result, which is/are returned to report sub-system 512 and/or sheet sub-system 514 for processing (e.g., along 571 and/or along 573, respectively), such as to generate the report or sheet responsive to the query (e.g., report request 551 and/or sheet request 553).

System 500 may receive a request for data (e.g., export request 566) via data exporter 520. In response to receiving the request for data, at 567, data exporter 520 communicates the request to evaluator service client 518 and at 568, the data is retrieved and returned to data exporter 520 at 568.

Figure 6:
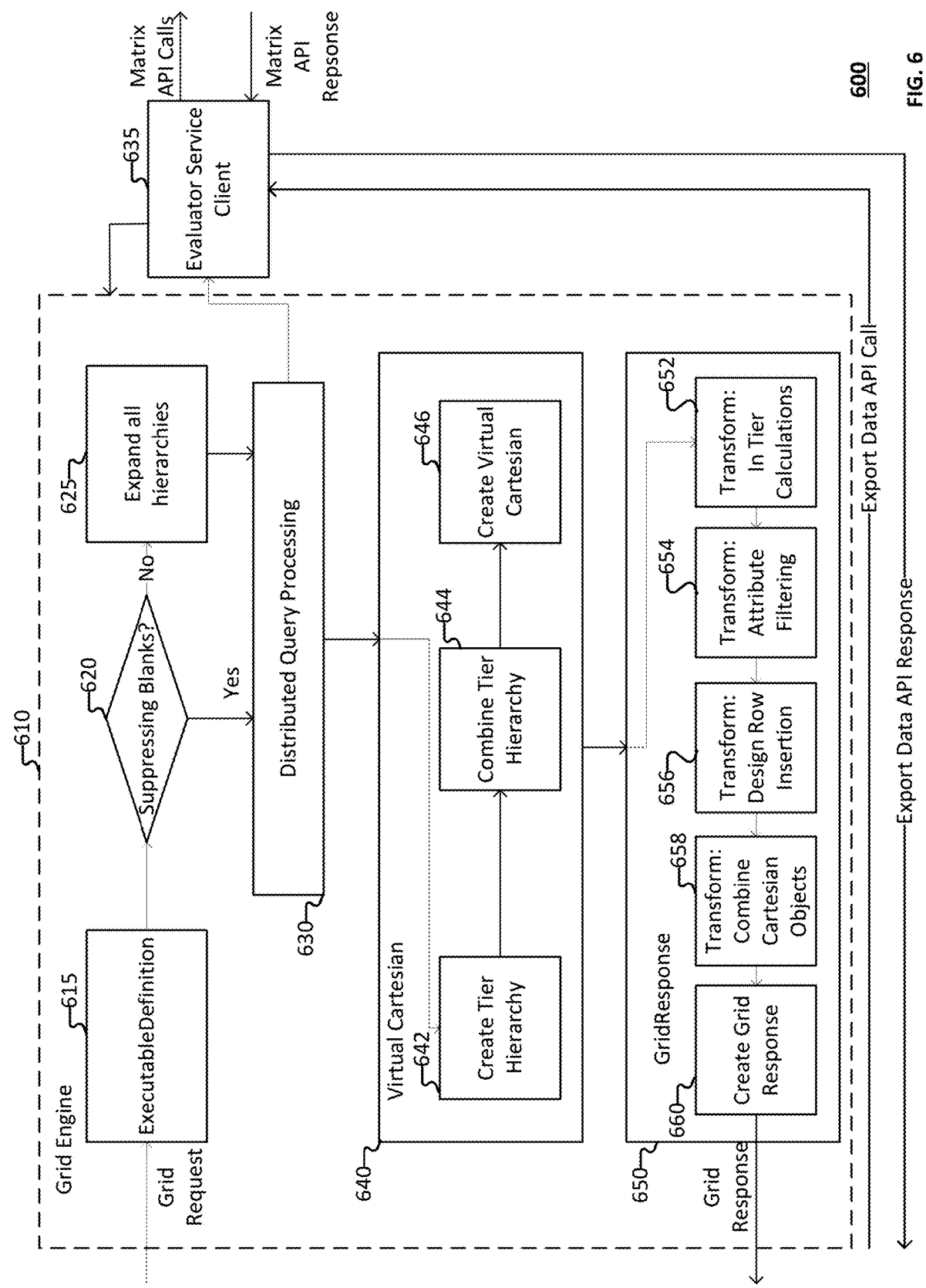
FIG. 6 is a block diagram of a system for processing queries according to various embodiments of the present application.

FIG. 6 is a block diagram of a system for processing queries according to various embodiments of the present application. In some embodiments, system 600 is implemented at least in part by system 100 of FIG. 1, system 200 of FIG. 2, and/or system 500 of FIG. 5. In some embodiments, system 600 implements process 700 of FIG. 7, process 800 of FIG. 8, process 900 of FIG. 9, and/or process 1100 of FIG. 11. According to various embodiments, system 600 corresponds to, or comprises, a system for processing a query against a sparsely populated hypercube, including receiving logic for a query, determining a set of locations in the hypercube at which data is expected to be stored, generating a call based on the set of locations (e.g., generating a declarative statement that delineates the various locations), communicating the call to a service (e.g., a query evaluator service) that will query the hypercube based on the dataset, obtaining the resulting data from the set of locations, and processing the data to obtain a result for the query.

In the example shown, system 600 comprises grid engine 610 and evaluator service client 635. In some embodiments, grid engine 610 corresponds to grid engine 516 of system 500, and evaluator service client 635 corresponds to evaluator service client 518. As illustrated in FIG. 6, grid engine 610 receives a query, such as a grid request, via ExecutableDefinition module 615. In response to receiving the grid request, ExecutableDefinition module 615 transforms the grid request into an internal object (e.g., an ExecutableDefinition). In some embodiments, ExecutableDefinition module 615 breaks the incoming grid definition associated with the grid request into a plurality of segment intersections, and determines dependencies and coordinates (e.g., cartesian coordinates corresponding to the dimensionality present in each segment intersection) needed for the plurality of segment intersections. Here intersection is used to mean that a segment from one axis intersects with a segment from another axis and the coordinates that are shared are in this intersection. ExecutableDefinition module 615 may further generate synthetic identifiers (IDs) for a set of coordinates of the resulting grid that need to be synthesized from multiple data points in the hypercube. Examples where synthetic IDs are required include in-tier calculations, arbitrary rollup of multiple elements in a filter, and a period-to-date.

At 620, grid engine 610 determines whether to implement the suppressing of cells comprising no data. In response to determining that cells comprising no data are not to be suppressed, at 625, grid engine 610 expands the tier hierarchies for the plurality of segment intersections and enforces size restrictions (e.g., size guardrails). The tier hierarchies are provided by 625 to 630 for distributed query processing.

In response to determining that cells comprising no data are to be suppressed, at 630, grid engine 610 performs a distributed query processing, including sending one or more calls/requests to the query evaluator service (e.g., via evaluator service client 635) for data pertaining to the plurality of segment intersections. In some embodiments, grid engine 610 combines requests for all of the plurality of segment intersections into a single call and communicates the call to evaluator service client 635. In some embodiments, grid engine 610 determines a set of calls respectively corresponding to one of the plurality of segment intersections and parallelizes the set of calls (or at least a subset of the set of calls) and communicates the set of calls to the query evaluator service (e.g., via evaluator service client 635). Grid engine 610 may combine or break up the different segment intersections into optimal combinations to call out of the query evaluator service in parallel. The combining or breaking up the different segment intersections may be determined based on the dependencies identified by ExecutableDefinition module 615.

The query evaluator service evaluates the one or more calls pertaining to the plurality of segment intersections against the underlying dataset and returns to grid engine 610 partial results for each data call (e.g., for each call to the dataset for a particular segment intersection). In response to receiving the partial results, grid engine 610 uses virtual cartesian module 640 to generate a plurality of virtual cartesian objects respectively corresponding to the partial results for the plurality of segment intersections. At 642, virtual cartesian module 640 creates a tier hierarchy for the data in a partial result. At 644, virtual cartesian module 640 combines the tier hierarchy for a segment intersection. At 646, virtual cartesian module 640 generates the virtual cartesian object for the segment intersection (e.g., the corresponding piece of the hypercube) based at least in part by combining the hierarchies for each segment intersection and binding the corresponding data.

In response to generating the plurality of virtual cartesian objects, grid engine 610 uses GridResponse module 650 to process the virtual cartesian objects and generate a grid response. At 652-656, GridResponse module 650 obtains the plurality of virtual cartesian objects and applies a transform with respect to the data comprised in the plurality of virtual cartesian objects. For example, at 652, GridResponse module 650 performs in-tier calculations for data in the cells of the virtual cartesian objects. As another example, at 654, GridResponse module 650 performs an attribute filtering transform (e.g., to obtain a grid with real cartesian coordinates matching the hypercube). As another example, at 656, GridResponse module 650 performs a row insertion transform. In response to obtaining the transformed virtual cartesian objects having real coordinates (e.g., coordinates matching the hypercube coordinates), at 658, GridResponse module 650 performs a transform to combine cartesian objects—for example, the plurality of transformed virtual cartesian objects are combined into a single cartesian object. GridResponse module 650 may enforce a size restriction with respect to the single cartesian object. For example, GridResponse module 650 enforces a bounding criteria with respect to the single cartesian object. The enforcing the bounding criteria with respect to the response to the query includes restricting a number of cells, rows, or columns in the response to a predefined maximum number or a predefined maximum size of a dimension of the combined object. At 660, grid engine 610 generates a grid response based on the single cartesian object. For example, grid engine 610 converts the single cartesian object to a scaler-indexed reduced cartesian object and the grid response is generated and returned, such as to the module for generating reports, sheets, etc. that are responsive to the query.

In some embodiments, the query language for the system (e.g., for the grid engine) corresponds to a predefined grid definition structure and in the example shown corresponds to the query language for the system (e.g., for the grid engine). The grid definition structure is a compact description of the data to be produced in a single call to the grid engine. For example, the grid definition structure describes the structure of the desired response, details of the data coordinates, and calculations to be used, and any other applicable parameter or setting that is to be used to control the rows, columns, or data. The grid definition based on the grid definition structure may be a Java object or represented in other forms such as JavaScript Object Notation (JSON) or Extensible Markup Language (XML). Various other languages or implementations may be implemented, such as declarative language formats.

The grid definition defines the structure of the grid, per-element properties, and the grid-level properties. With respect to the structure, the grid definition includes the grid definition structure that describes segments along the X-axis and/or Y-axis, tiers, and elements. For example, the grid definition structure describes the dimensional coordinates of the hypercube that will be used to generate the rows and columns of the grid. The grid definition structure may further define a filter (e.g., dimensional coordinates to filter the entire grid). The grid definition structure may include an indication of blank spacers, which are blank rows or columns that are to be inserted into the grid. The grid definition structure may include text headers, such as a blank row or column with a text label to be inserted into the grid. The grid definition structure may include a definition of values of a single dimension to use for creating multiple stacked grids, such as for a repeating grid.

In some embodiments, the grid definition includes properties on a per-element basis. For example, the grid definition defines one or more of calculation rules, an expansion state, and/or display rules. Examples of the calculation rules include calculations for calculation types supported by in-grid calculations, such as a subtotal, a difference, or a custom calculation using a formula expression (e.g., a formula defined based at least in part on the query logic). Examples of the expansion state include a definition of how the logical tree structure is to be rooted at the element to appear expanded, collapsed, partially expanded, or a restriction for only leaves to be provided. Examples of display rules include rules for precision and percentage display of numbers.

In some embodiments, the grid definition defines one or more grid-level properties. The grid-level properties may include show split settings, suppress rollups settings, suppress roles or columns that are blank settings, a setting indicating whether the grid or cell is explorable or expandable, and a setting indicating whether totals are to be provided. An example of show split setting is Boolean logic to control splitting of the grid, such as details at a particular location splitting the values for a single account. The show splitting setting may be combined with other rules to determine per-account if split details should be included in the data calls. For example, an account appearing as a term in a formula does not require split details, but a leaf account on an inner tier does. An example of the suppress rollups is Boolean logic that controls the behavior of hierarchies, if true, we suppress all expanded parents, and only show leaves of the visible trees. An example of suppress rows or columns that are blank settings includes a set of controls to allow suppressing a row if (i) every cell in the row is blank, or (ii) if every cell in that row is either blank or 0. An example of a setting indicating whether the grid or cell is explorable or expandable includes Boolean logic that indicates whether the grid is to support interactions such as dynamically expanding trees or exploring into individual cells in the grid. If the grid is defined to support such explorable/expandable functionality, the system configures the grid to store more information within the grid. An example of a setting indicating whether totals are to be provided includes an indication of whether a row providing total values should be configured at the top or bottom of the grid.

Figure 7:
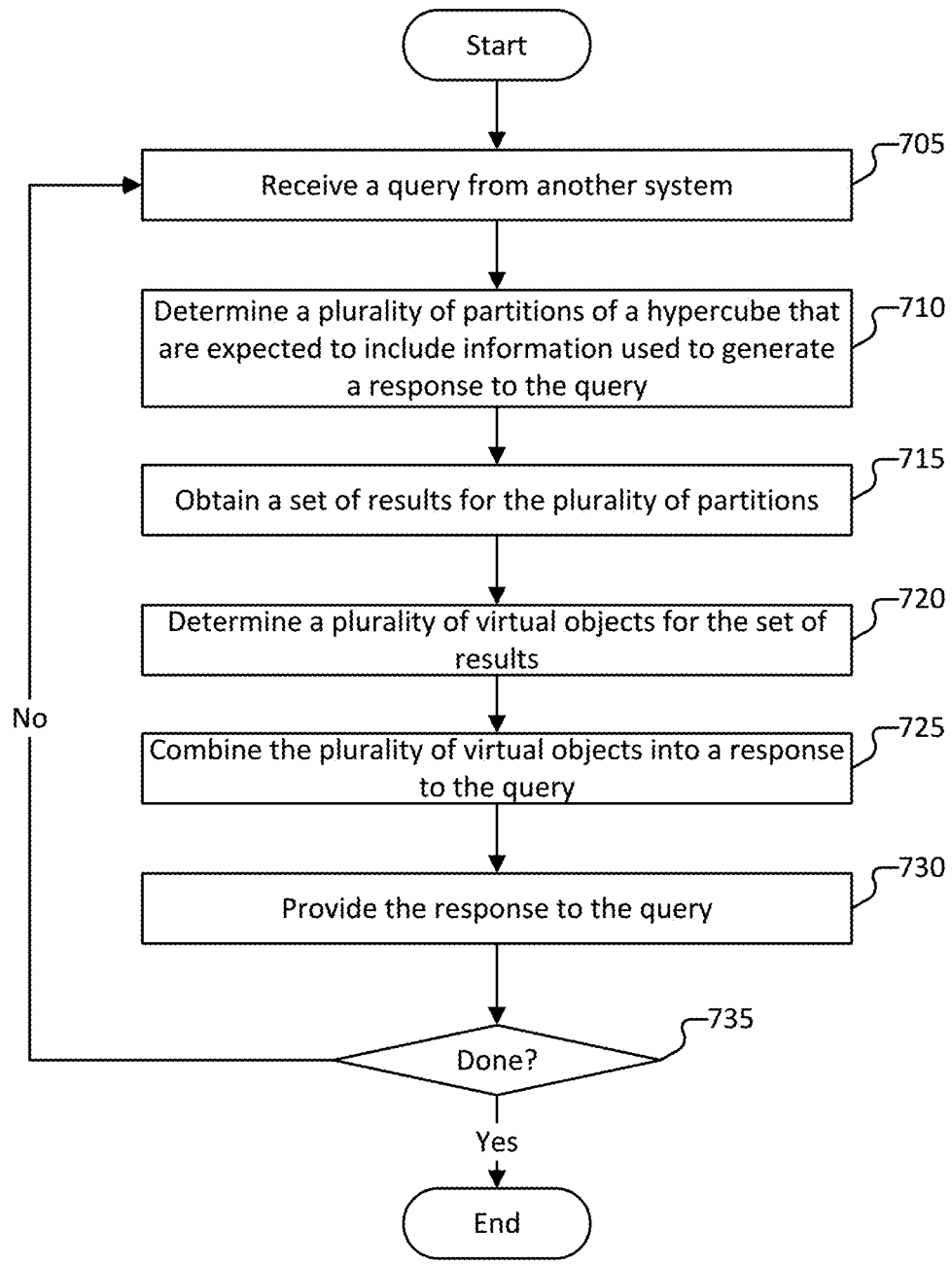
FIG. 7 is a diagram of a process for servicing a query on a sparsely populated dataset according to various embodiments of the present application.

FIG. 7 is a diagram of a process for servicing a query on a sparsely populated dataset according to various embodiments of the present application. In some embodiments, process 700 is implemented at least in part by system 100 of FIG. 1 and/or system 200 of FIG. 2. In some embodiments, process 700 is implemented by planning service 510 (e.g., grid engine 516) of system 500.

At 705, a query is obtained from another system. The other system may be a client system or another system that is providing a service, such as a service for which information responsive to the query is to be used.

At 710, the system determines a plurality of partitions of a hypercube that are expected to include information used to generate a response to the query. At 715, a set of results is obtained for the plurality of partitions. At 720, a plurality of virtual objects for the set of results is determined. At 725, the plurality of virtual objects is combined into a response to the query. At 730, a response is provided to the query. At 735, a determination is made as to whether process 700 is complete. In some embodiments, process 700 is determined to be complete in response to a determination that no further queries are to be processed, the response to the query has been successfully communicated, the user has exited the system, an administrator indicates that process 700 is to be paused or stopped, etc. In response to a determination that process 700 is complete, process 700 ends. In response to a determination that process 700 is not complete, process 700 returns 705.

Figure 8:
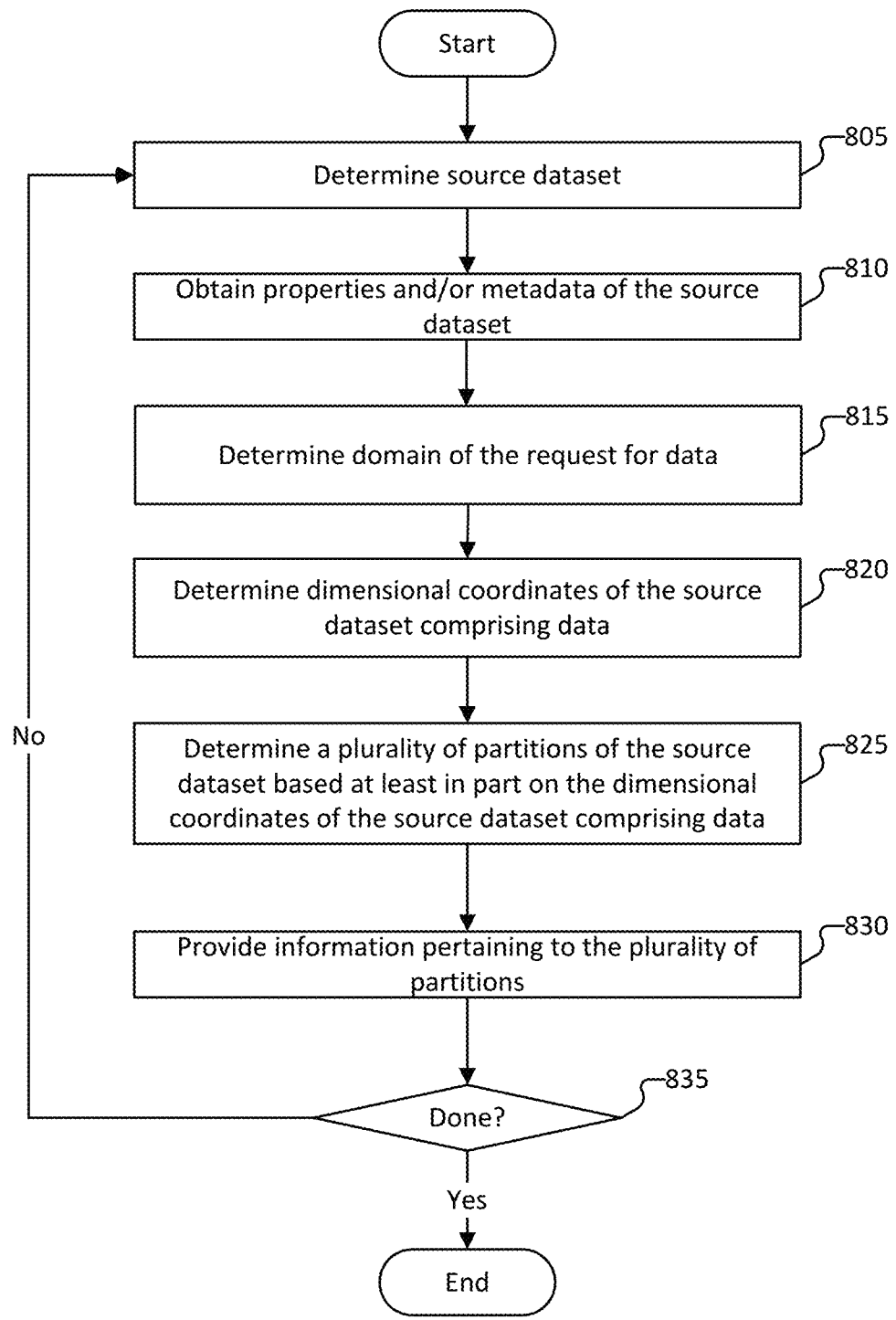
FIG. 8 is a diagram of a process for determining a partitioning of a dataset into one or more partitions at which the dataset is expected to comprise data according to various embodiments of the present application.

FIG. 8 is a diagram of a process for determining a partitioning of a dataset into one or more partitions at which the dataset is expected to comprise data according to various embodiments of the present application. In some embodiments, process 800 is implemented at least in part by system 100 of FIG. 1 and/or system 200 of FIG. 2. In some embodiments, process 800 is implemented by planning service 510 (e.g., grid engine 516) of system 500.

In some embodiments, process 800 is invoked in connection with 710 of process 700.

At 805, a source dataset is determined. At 810, properties and/or metadata of the source dataset are obtained. At 815, a domain of the request for data is determined. At 820, dimensional coordinates of the source dataset comprising data are determined. In some embodiments, the dimensional coordinates of the dataset are bounded by the domain of the request. At 825, a plurality of partitions of the source dataset is determined based at least in part on the dimensional coordinates of the source dataset comprising data. At 830, information pertaining to the plurality of partitions is provided. At 835, a determination is made as to whether process 800 is complete. In some embodiments, process 800 is determined to be complete in response to a determination that no further queries are to be processed, the user has exited the system, an administrator indicates that process 800 is to be paused or stopped, etc. In response to a determination that process 800 is complete, process 800 ends. In response to a determination that process 800 is not complete, process 800 returns 805.

Figure 9:
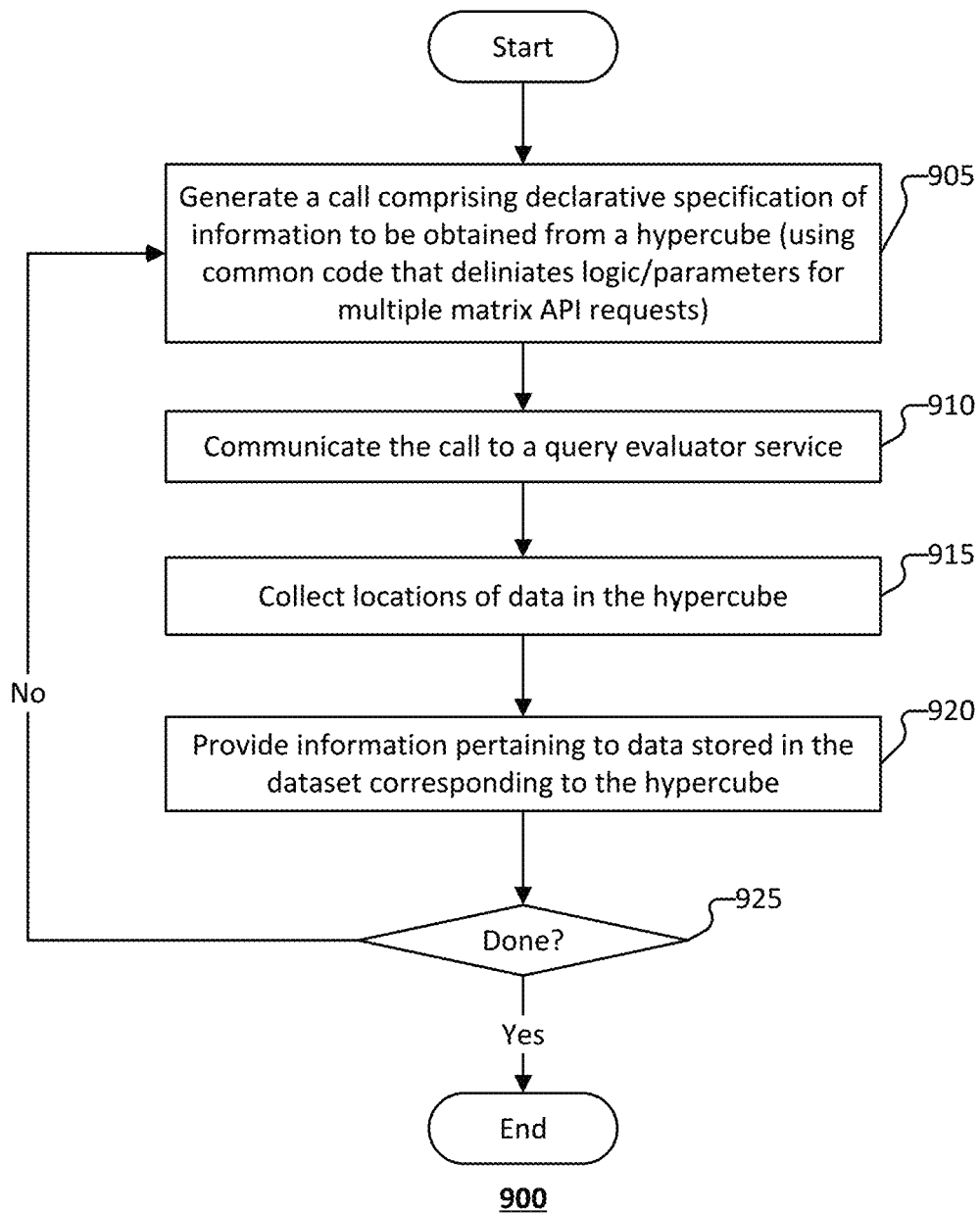
FIG. 9 is a diagram of a process for obtaining from a query evaluator service information pertaining to a response of a query according to various embodiments of the present application.

FIG. 9 is a diagram of a process for obtaining from a query evaluator service information pertaining to a response of a query according to various embodiments of the present application. In some embodiments, process 900 is implemented at least in part by system 100 of FIG. 1 and/or system 200 of FIG. 2. In some embodiments, process 900 is implemented by planning service 510 (e.g., grid engine 516) of system 500.

In some embodiments, process 900 is invoked in connection with 715 of process 700.

At 905, a call comprising a declarative specification of the information to be obtained from a hypercube is generated. At 910, the call is communicated to a query evaluator service. At 915, locations of data in the hypercube are collected. At 920, information pertaining to data stored in the dataset corresponding to the hypercube is provided. At 925, a determination is made as to whether process 900 is complete. In some embodiments, process 900 is determined to be complete in response to a determination that no further data for additional partitions is to be obtained, no further queries are to be executed, the user has exited the system, an administrator indicates that process 900 is to be paused or stopped, etc. In response to a determination that process 900 is complete, process 900 ends. In response to a determination that process 900 is not complete, process 900 returns 905.

Figure 10:
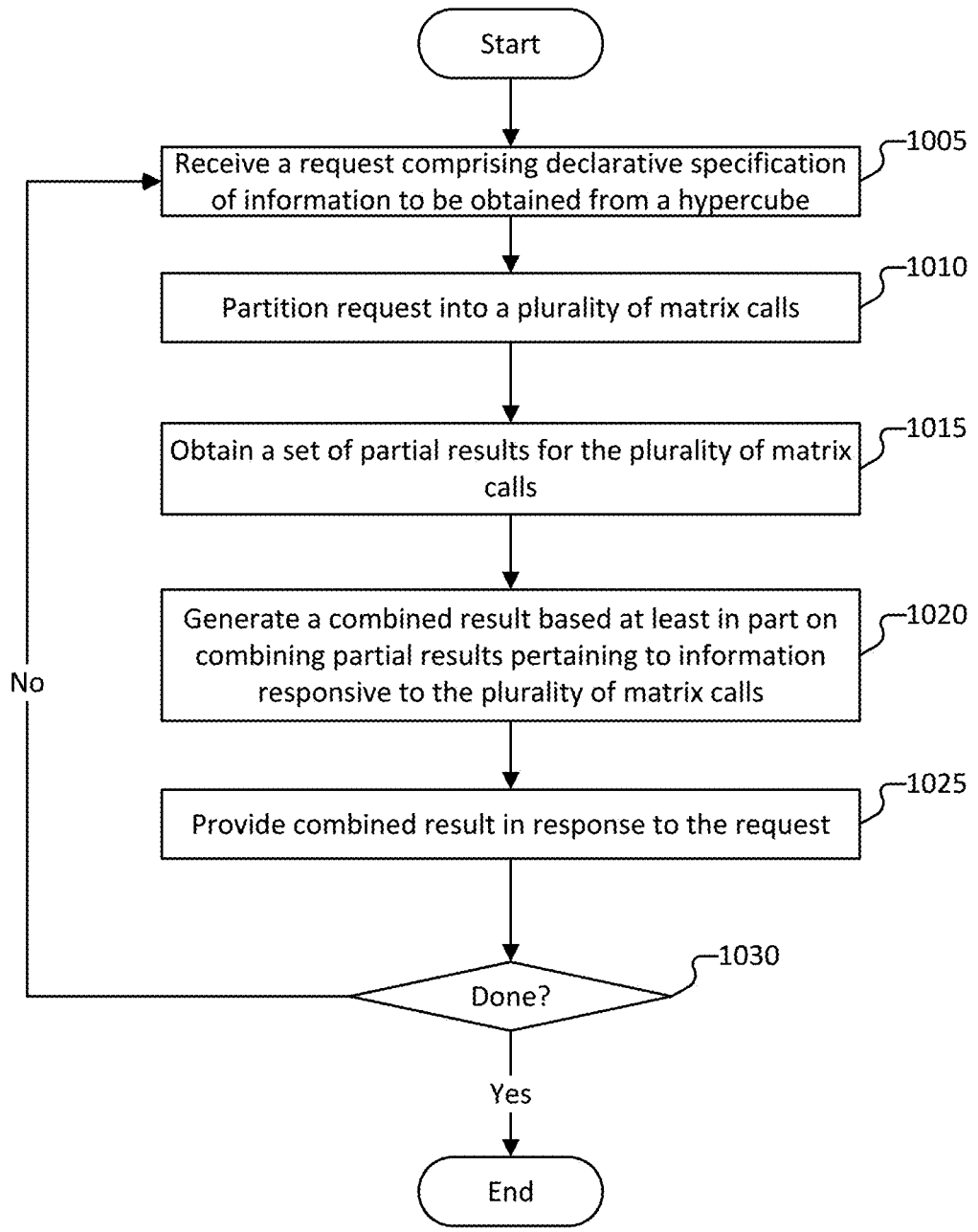
FIG. 10 is a diagram of a process for determining a combined result for data comprised in a plurality of partitions according to various embodiments of the present application.

FIG. 10 is a diagram of a process for determining a combined result for data comprised in a plurality of partitions according to various embodiments of the present application. In some embodiments, process 1000 is implemented at least in part by system 100 of FIG. 1 and/or system 200 of FIG. 2. In some embodiments, process 1000 is implemented by a query evaluator service, such as evaluator service 530 of system 500.

In some embodiments, process 1000 is invoked in connection with 715 of process 700. For example, process 1000 is invoked in response to the query evaluator service receiving the call from the planning service (e.g., the grid engine).

At 1005, a request comprising a declarative specification of information to be obtained from a hypercube is received. At 1010, the request is partitioned into a plurality of matrix calls. At 1015, a set of partial results for the plurality of matrix calls is obtained. At 1020, a combined result is generated based at least in part on combining the partial results pertaining to information responsive to the plurality of matrix calls. At 1025, the combined result is provided in response to the request. At 1030, a determination is made as to whether process 1000 is complete. In some embodiments, process 1000 is determined to be complete in response to a determination that no further objects for partitions of the dataset are to be processed or combined into the combined result, no combined results for queries are to be provided, no further queries are to be executed, the user has exited the system, an administrator indicates that process 1000 is to be paused or stopped, etc. In response to a determination that process 1000 is complete, process 1000 ends. In response to a determination that process 1000 is not complete, process 1000 returns to 1005.

Figure 11:
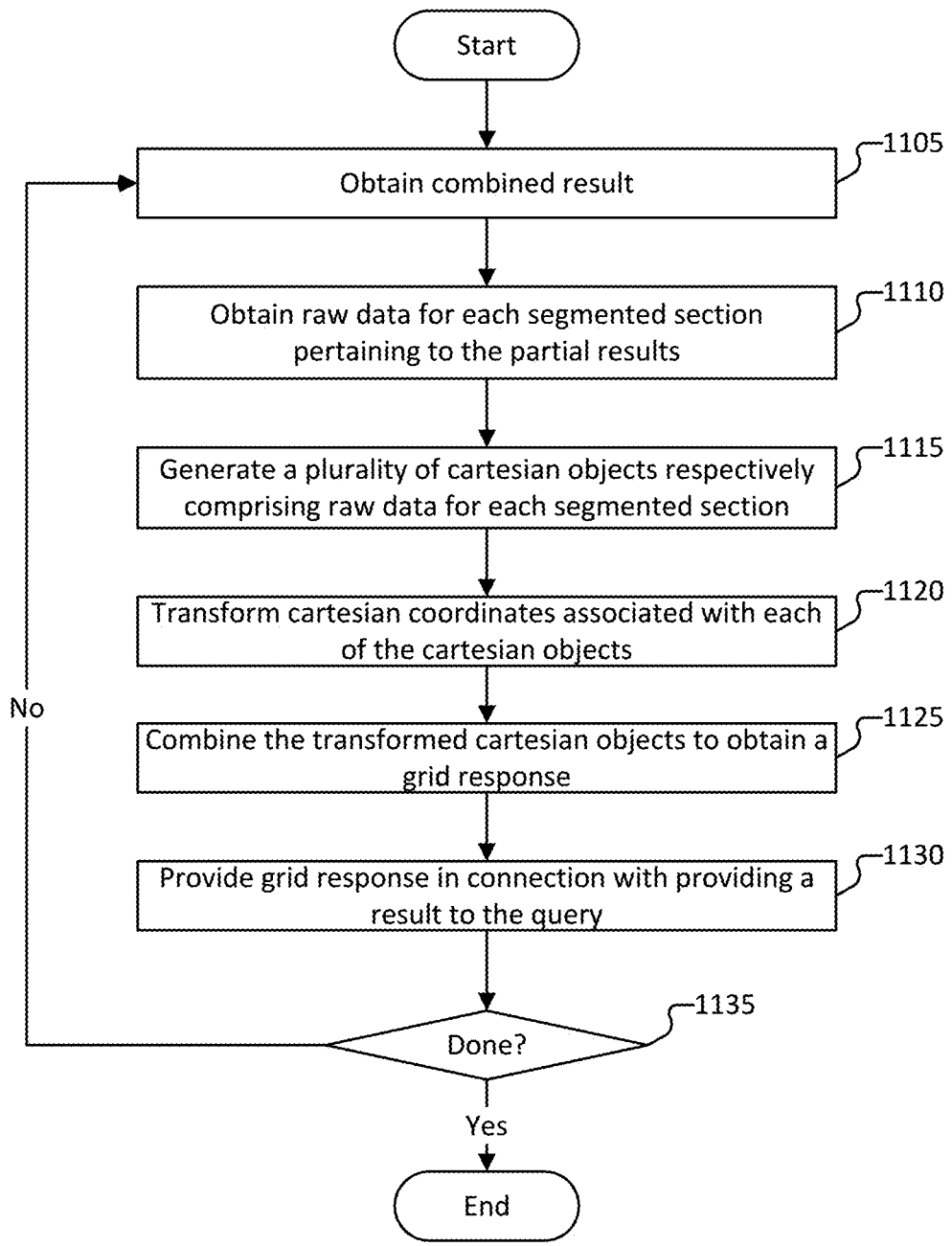
FIG. 11 is a diagram of a process for generating a result to the query according to various embodiments of the present application.

FIG. 11 is a diagram of a process for generating a result to the query according to various embodiments of the present application. In some embodiments, process 1100 is implemented at least in part by system 100 of FIG. 1 and/or system 200 of FIG. 2. In some embodiments, process 1100 is implemented by planning service 510 (e.g., grid engine 516) of system 500.

In some embodiments, process 1100 is invoked in connection with 720-730 of process 700.

At 1105, a combined result is obtained. At 1110, raw data for each segmented section pertaining to the partial results is obtained. At 1115, a plurality of cartesian objects (e.g., virtual cartesian objects) respectively comprising raw data for each segmented section is generated. At 1120, cartesian coordinates associated with each of the cartesian objects are transformed. At 1125, the transformed cartesian objects are combined to obtain a grid response. At 1130, a grid response is provided in connection with providing a result to the query. At 1135, a determination is made as to whether process 1100 is complete. In some embodiments, process 1100 is determined to be complete in response to a determination that no further objects for partitions of the dataset are to be processed or combined into the combined result, no further results are to be provided, no further queries are to be executed, the user has exited the system, an administrator indicates that process 1100 is to be paused or stopped, etc. In response to a determination that process 1100 is complete, process 1100 ends. In response to a determination that process 1100 is not complete, process 1100 returns to 1105.

Various examples of embodiments described herein are described in connection with flow diagrams. Although the examples may include certain steps performed in a particular order, according to various embodiments, various steps may be performed in various orders and/or various steps may be combined into a single step or may be performed in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
   receive a query from a client system;
   determine, based at least in part on the query, a plurality of partitions of a hypercube that are expected to comprise information used in generating a response for the query, wherein determining the plurality of partitions comprises:
   obtaining an incoming grid definition based at least in part on the query;
   segmenting the incoming grid definition into segment intersections; and
   determining dependencies and coordinates associated with the segment intersections;
   obtain, from a data source, a set of results for the plurality of partitions, the set of results comprising data stored in the plurality of partitions of the hypercube;
   determine a plurality of virtual objects for the set of results;
   combine the plurality of virtual objects into the response to the query; and
   provide, to the client system, the response to the query; and
   a memory coupled to the one or more processors and configured to provide the one or more processors with instructions.

2. The system of claim 1, wherein the response to the query comprises a grid of data that is used to build a report or a sheet.

3. The system of claim 1, wherein:
   the one or more processors are further configured to communicate a set of requests to a data source storing the hypercube;
   the set of requests comprising one or more requests corresponding to the plurality of partitions of the hypercube; and
   at least a subset of the set of requests is processed in parallel.

4. The system of claim 1, wherein combining the plurality of virtual objects into the response comprises enforcing a bounding criteria with respect to the response to the query.

5. The system of claim 4, wherein the enforcing the bounding criteria with respect to the response to the query includes restricting a number of cells, rows, or columns in the response to a predefined maximum number.

6. The system of claim 1, wherein the one or more processors are further configured to:
communicate a set of requests to the data source storing the hypercube, the set of requests comprising one or more requests corresponding to the plurality of partitions of the hypercube, the set of requests corresponding to the set of results.

7. The system of claim 1, wherein a first virtual object represents a part of the hypercube, the part of the hypercube defined based at least in part on a corresponding first request of a set of requests corresponding to the plurality of partitions which is communicated to the data source storing the hypercube.

8. The system of claim 1, wherein the plurality of partitions is determined by translating the query into a declarative description of locations in the hypercube at which data is to be computed.

9. The system of claim 1, wherein the determining the plurality of partitions further comprises:
generating a set of identifiers for coordinates associated with a resulting grid that are to be synthesized from multiple data points in the hypercube.

10. The system of claim 9, wherein an identifier of the set of identifiers is generated in response to determining that the query includes an in-tier calculation.

11. The system of claim 1, wherein a set of requests for information stored in the plurality of partitions is determined based at least in part on the dependencies and coordinates associated with the segment intersections.

12. The system of claim 1, wherein the plurality of virtual objects define a virtual cartesian comprising a plurality of dimensions and for each dimension a set of dimension values.

13. The system of claim 1, wherein the plurality of virtual objects define a value map corresponding to an enumeration of cells in the hypercube that are associated with data.

14. The system of claim 13, wherein each of the cells in the hypercube enumerated in the value map is identified by a hypercube location vector comprising an array of coordinate values for each of the plurality of dimensions.

15. The system of claim 13, wherein the virtual object is converted into a linear cartesian comprising cells for a corresponding partition that have data.

16. The system of claim 1, wherein the plurality of virtual objects are combined in to the response to the query based at least in part on the dependencies associated with the segment intersections.

17. A method, comprising:
receiving, by one or more processors, a query from a client system;
determining, based at least in part on the query, a plurality of partitions of a hypercube that are expected to comprise information used in generating a response for the query, wherein determining the plurality of partitions comprises:
obtaining an incoming grid definition based at least in part on the query;
segmenting the incoming grid definition into segment intersections; and
determining dependencies and coordinates associated with the segment intersections;
obtaining, from a data source, a set of results to the set of requests, the set of results comprising data stored in the plurality of partitions of the hypercube;
determining a plurality of virtual objects for the set of results;
combining the plurality of virtual objects into a response to the query; and
providing, to the client system, the response to the query.

18. A computer program product embodied in a non-transitory computer readable medium and comprising computer instructions for:
receiving, by one or more processors, a query from a client system;
determining, based at least in part on the query, a plurality of partitions of a hypercube that are expected to comprise information used in generating the response for the query, wherein determining the plurality of partitions comprises:
obtaining an incoming grid definition based at least in part on the query;
segmenting the incoming grid definition into segment intersections; and
determining dependencies and coordinates associated with the segment intersections;
obtaining, from a data source, a set of results to the set of requests, the set of results comprising data stored in the plurality of partitions of the hypercube;
determining a plurality of virtual objects for the set of results;
combining the plurality of virtual objects into the response to the query; and
providing, to the client system, the response to the query.

* * * * *